(12) United States Patent
Schoettle et al.

(10) Patent No.: US 6,769,640 B2
(45) Date of Patent: Aug. 3, 2004

(54) CARTRIDGE FOR DATA RECORDING MEDIA IN TAPE FORM, IN PARTICULAR A SINGLE-REEL CARTRIDGE

(75) Inventors: Klaus Schoettle, Strasbourg (FR); Matthias Kuenstner, Schutterwald (DE); Edgar Hummel, Kehl (DE)

(73) Assignee: EMTEC Magnetics GmbH, Ludwigshafen (DE)

( * ) Notice: Subject to any disclaimer, the term of this patent is extended or adjusted under 35 U.S.C. 154(b) by 0 days.

(21) Appl. No.: 10/239,850

(22) PCT Filed: May 10, 2001

(86) PCT No.: PCT/EP01/05308

§ 371 (c)(1),
(2), (4) Date: Oct. 1, 2002

(87) PCT Pub. No.: WO01/88919

PCT Pub. Date: Nov. 22, 2001

(65) Prior Publication Data

US 2003/0089810 A1 May 15, 2003

(30) Foreign Application Priority Data

May 16, 2000 (DE) ........................................ 100 23 854

(51) Int. Cl.⁷ ............................................ G11B 23/107
(52) U.S. Cl. .................................... 242/348.2; 360/132
(58) Field of Search .............................. 242/348, 348.2; 360/132

(56) References Cited

U.S. PATENT DOCUMENTS 6,236,539 B1    5/2001  Morita et al.

2001/0000983 A1   5/2001  Morita et al.
2001/0006201 A1   7/2001  Morita et al.

FOREIGN PATENT DOCUMENTS

| EP | 0924702 | 6/1999 |
| EP | 0926675 | 6/1999 |
| JP | 11-339436 | 12/1999 |
| JP | 2000-331452 | 11/2000 |
| JP | 2001-110165 | 4/2001 |
| WO | 00/31739 | 6/2000 |

*Primary Examiner*—John Q. Nguyen
(74) *Attorney, Agent, or Firm*—Greenblum & Bernstein, P.L.C.

(57) ABSTRACT

Cartridge having a housing which includes a lower cartridge part and an upper cartridge part. The lower cartridge part and the upper cartridge part are connected together. Each of the lower cartridge part and the upper cartridge part include side walls and a recess which is adapted to receive a tape guiding pin. A reel is rotatably mounted in the housing. A tape guiding pin clasp fixes the tape guiding pin in the recesses of the lower cartridge part and the upper cartridge part. The tape guiding pin is located in a region of a tape exit opening that is located in a corner of the housing. The tape exit opening is adapted to be closed by a sliding door. The tape guiding pin clasp includes a mechanism that secures at least one side wall of the lower cartridge part to at least one side wall of the upper cartridge part. The tape guiding pin clasp engages with and secures together the at least one side wall of the lower cartridge part and the at least one side wall of the upper cartridge part.

26 Claims, 10 Drawing Sheets

PRIOR ART

PRIOR ART

CARTRIDGE FOR DATA RECORDING MEDIA IN TAPE FORM, IN PARTICULAR A SINGLE-REEL CARTRIDGE

CROSS-REFERENCE TO RELATED APPLICATIONS

The present application is a National Stage Application of International Application No. PCT/EP01/05308, filed May 10, 2001. Further, the present application claims priority under 35 U.S.C. §119 of German Patent Application No. DE 100 23 854.8 filed on May 16, 2000.

BACKGROUND OF THE INVENTION

1. Field of the Invention

The invention relates to a cartridge for data recording media in tape form, in particular a single-reel cartridge.

2. Discussion of Background Information

As can be seen from FIGS. 1 to 3, cartridges for data recording media in tape form, in particular single-reel cartridges, essentially comprise a housing, that is formed by a lower housing part 701 and an upper housing part 702. These housings are screwed to each other. A reel 30 is rotatably mounted in the housing and has a magnetic tape wound up on it (not shown). A free end is connected to a tape guiding pin 50. The pin is fixed by means of a tape guiding pin clasp 40 in housing recesses 709 of the lower cartridge part 701 and of the upper cartridge part 702 which are located in the region of the tape exit opening. The tape exit opening is located in a corner of the housing and is capable of being closed by a spring- loaded sliding door 60.

A cartridge of the generic type, or components of it, such as for example the spring- loaded sliding door of the tape exit opening, the reel brake and the leader pin clasp, are, for example, the subject of the applications EP 0 924 702 A1 and EP 0 926 675 A1.

For satisfactory functioning of the tape guiding pin gripper on the equipment side, a closely toleranced retaining force is required for the tape guiding pin 50. Furthermore, the tape guiding pin 50 is to consist of non-magnetic and stainless metal. As a result of this requirement, the applicant regards the use of stainless steel to be unfavorable for the tape guiding pin clasp 40 and tape guiding pin 50. Use of the stainless steel/stainless steel material pairing is unfavorable to the extent that it has a tendency to "seize" and consequently, during the course of use, the defined retaining force for the tape guiding pin 50 exceeds the permissible tolerance on account of changing frictional conditions. To be regarded as a further factor with adverse effects on the required constant retaining force are the production-related tolerances, which have a disproportionate effect in the case of tape guiding pin clasps of this size that are produced from spring steel wire or spring sheet metal.

As already mentioned at the beginning, a cartridge with screwed housing halves is concerned here. This type of connection for the housing halves appears to the applicant to be favorable insofar as, in the case of repair, it offers the user an advantage with respect to access to the data stored in the cartridge that is not be underestimated. For example, if a cartridge with welded housing halves is damaged by the use of force so severely that it can no longer be loaded in the drive, the stored data are usually also lost, since prizing open the welded cartridge entails considerable risks for the data stored on the data medium in tape form contained in it. In contrast, a cartridge with a screwed housing can be opened without any problem, and the roll of tape with the stored data can easily be removed if need be and placed into an undamaged cartridge housing.

However, set against this advantage is the not insignificant disadvantage that, in at least one region, the position of the screwed connection cannot be optimally chosen. For system-related reasons, no screwed connection can be provided within the region of the area A represented in FIG. 1 due to the gripper used for the tape guiding pin 50 and the required free running-out space for the data recording medium in tape form. This has the consequence that the screwed cartridge does not meet the requirements of a standardized drop test, in which the cartridge is subjected to a free drop from approximately 1 meter.

As the tests conducted by the applicant show, the separating joint 720 between the lower housing part 701 and the upper housing part 702 of the cartridge side walls 711 and 712 lying in the running-out direction of the tape tends to gape apart, with the housing halves changing their predetermined position in relation to each other, both horizontally and vertically, in this region. Consequently, the tape guiding pin 50 can both assume a position deviating from its predetermined position of rest, or become jammed, and it can also spring out of its arrestment. The tape guiding pin 50 can, in this cases no longer be taken up by the gripper on the equipment side, of the tape guiding device. As a result, the cartridge consequently cannot function.

The prior art and these considerations therefore gave rise to the object of eliminating the disadvantages described of the inconstant retaining force on the cartridge side for the tape guiding pin 50 and its inadequate positional fixing under the stress occurring when the cartridge is dropped.

SUMMARY OF THE INVENTION

The invention therefore provides for a cartridge of the type stated at the beginning that is provided with a tape guiding pin clasp and which includes a clasp additionally having a mechanism which fixes the cartridge side walls of the housing lower part and of the housing upper part, lying in the running-out direction of the tape, in a positively engaging manner and with effect in the horizontal and vertical directions.

The invention therefore provides for a cartridge having a housing which includes a lower cartridge part and an upper cartridge part. The lower cartridge part and an upper cartridge part are connected together. Each of the lower cartridge part and the upper cartridge part include side walls and a recess which is adapted to receive a tape guiding pin. A reel is rotatably mounted in the housing. A tape guiding pin clasp fixes the tape guiding pin in the recesses of the lower cartridge part and the upper cartridge part. The tape guiding pin is located in a region of a tape exit opening that is located in a corner of the housing. The tape exit opening is adapted to be closed by a sliding door. The tape guiding pin clasp includes a mechanism that fixes at least one side wall of the lower cartridge part to at least one side wall of the upper cartridge part. The tape guiding pin clasp engages with and fixes together the at least one side wall of the lower cartridge part and the at least one side wall of the upper cartridge part.

The cartridge may be of the type for data recording media in tape form. The cartridge may be of the single-reel type. The lower cartridge part and an upper cartridge part may be connected together with screws. The reel may comprise wound magnetic tape. The tape guiding pin clasp may comprise two spring elements and a retaining plate portion. The tape guiding pin clasp may positively engage with and fix together the at least one side wall of the lower cartridge part and the at least one side wall of the upper cartridge part in both a horizontal direction and a vertical direction. The tape guiding pin clasp may engage with and fix together the at least one side wall of the lower cartridge part and the at least one side wall of the upper cartridge part via at least two clip connections. The mechanism that fixes the at least one side wall of the lower cartridge part to the at least one side wall of the upper cartridge part may comprise two clips. Each of the two clips may be coupled to a retaining plate of the tape guiding pin clasp. Each of the two clips may engage in a corresponding recess in each of the at least one side walls. The tape guiding pin clasp may be arranged in a dovetail guide of the housing. The tape guiding pin clasp may comprise bevels which engage the dovetail guide. The tape guiding pin clasp may comprise bevels. The tape guiding pin clasp may comprise bevels and guiding surfaces formed by the bevels. The tape guiding pin clasp may comprise at least one arresting portion. An overall height of the at least one arresting portion may correspond to a height of a clamping portion of the tape guiding pin. The tape guiding pin clasp may comprise two arresting portions. The tape guiding pin clasp may comprise at least one spring arm. The tape guiding pin clasp may comprise a plastic material. The plastic material may comprise a high-grade moldable plastic. The high-grade moldable plastic may comprise one of a polycarbonate, a polyamide and a polyoxymethylene, as a base material. The high-grade moldable plastic may comprise at least one of fillers and functional additives. The tape guiding pin clasp may comprise carbon-fiber-reinforced polyoxymethylene with polytetrafluoroethylene.

The invention also provides for a cartridge comprising a housing which includes a lower cartridge part and an upper cartridge part. Each of the lower cartridge part and the upper cartridge part comprise side walls and a recess which is adapted to receive a pin. A pin clasp has two spring arms adapted to retain the pin in the recesses of the lower cartridge part and the upper cartridge part. The pin clasp comprises a first engaging clip portion that engages the at least one side wall of the lower cartridge part and a second engaging clip portion that engages the at least one side wall of the upper cartridge part. The pin clasp secures together the at least one side wall of the lower cartridge part and the at least one side wall of the upper cartridge part.

The invention also provides a magnetic tape cartridge comprising a housing which includes a lower cartridge part and an upper cartridge part. Each of the lower cartridge part and the upper cartridge part comprises side walls and a recess which is adapted to receive a pin. A plastic pin clasp has two spring arms adapted to retain the pin in the recesses of the lower cartridge part and the upper cartridge part. The plastic pin clasp comprises a first engaging clip portion that engages the at least one side wall of the lower cartridge part and a second engaging clip portion that engages the at least one side wall of the upper cartridge part. The plastic pin clasp secures together the at least one side wall of the lower cartridge part and the at least one side wall of the upper cartridge part.

BRIEF DESCRIPTION OF THE DRAWINGS

The invention is now explained in more detail with reference to the drawings, in which specifically.

DETAILED DESCRIPTION OF THE INVENTION

A first embodiment of the tape guiding pin clasp 40a will now be described with reference to FIG. 4, FIG. 8 and FIG. 9.

Figure 9:
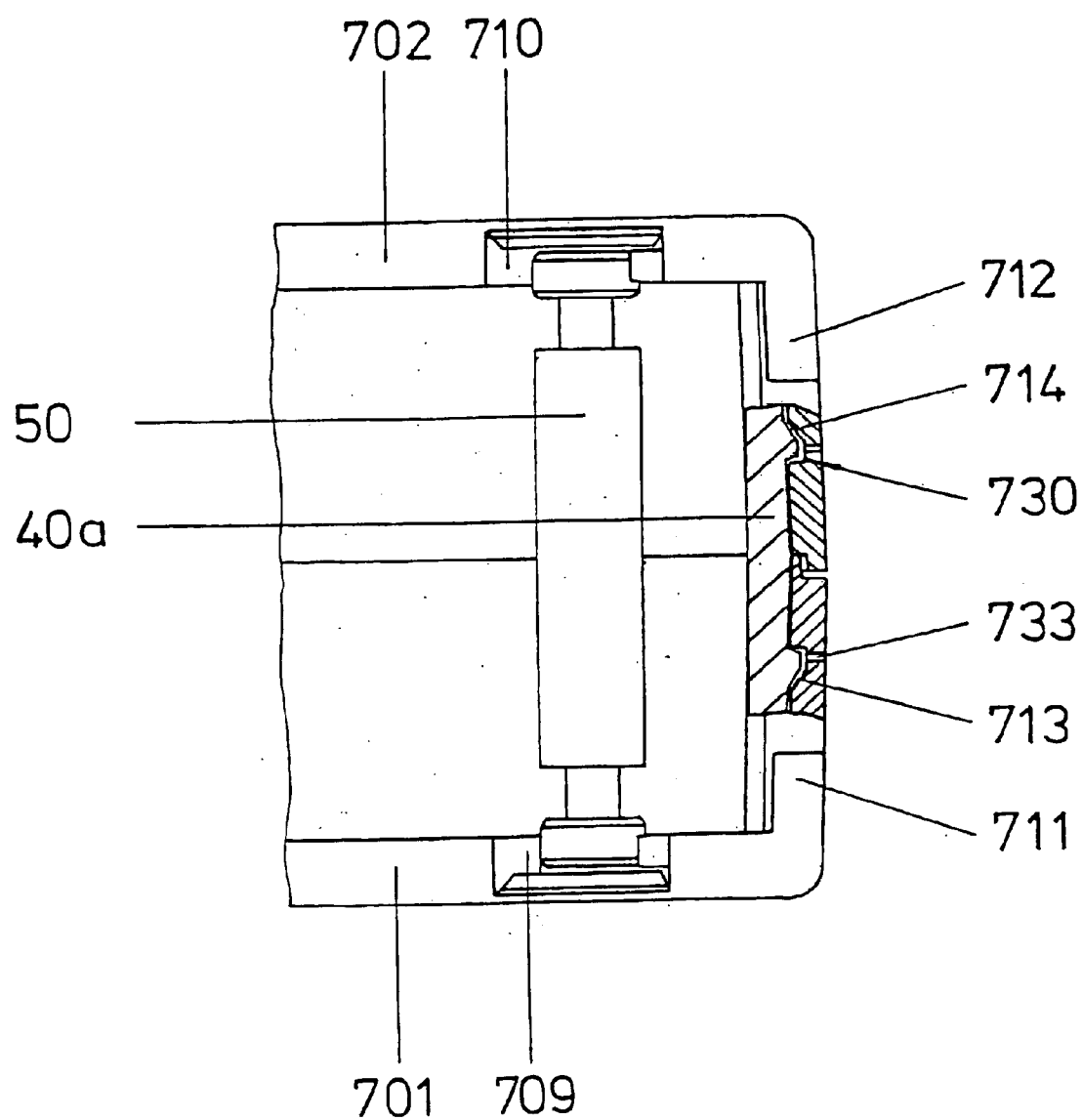
FIG. 9 shows a vertical section through the region of the tape exit opening of the first embodiment of a cartridge according to the invention.

As shown in FIG. 9, the positively engaging fixing, with effect in the horizontal and vertical directions, of the cartridge side walls 711 and 712, lying in the running-out direction of the tape in relation to each other, takes place by way of at least two clip connections 730 and with the clips 403a. These clips 403a are integrated into the retaining plate 401a of the tape guiding pin clasp 40a and are capable of engaging with corresponding recesses 713 and 714 of the cartridge side walls 711 and 712.

Figure 1:
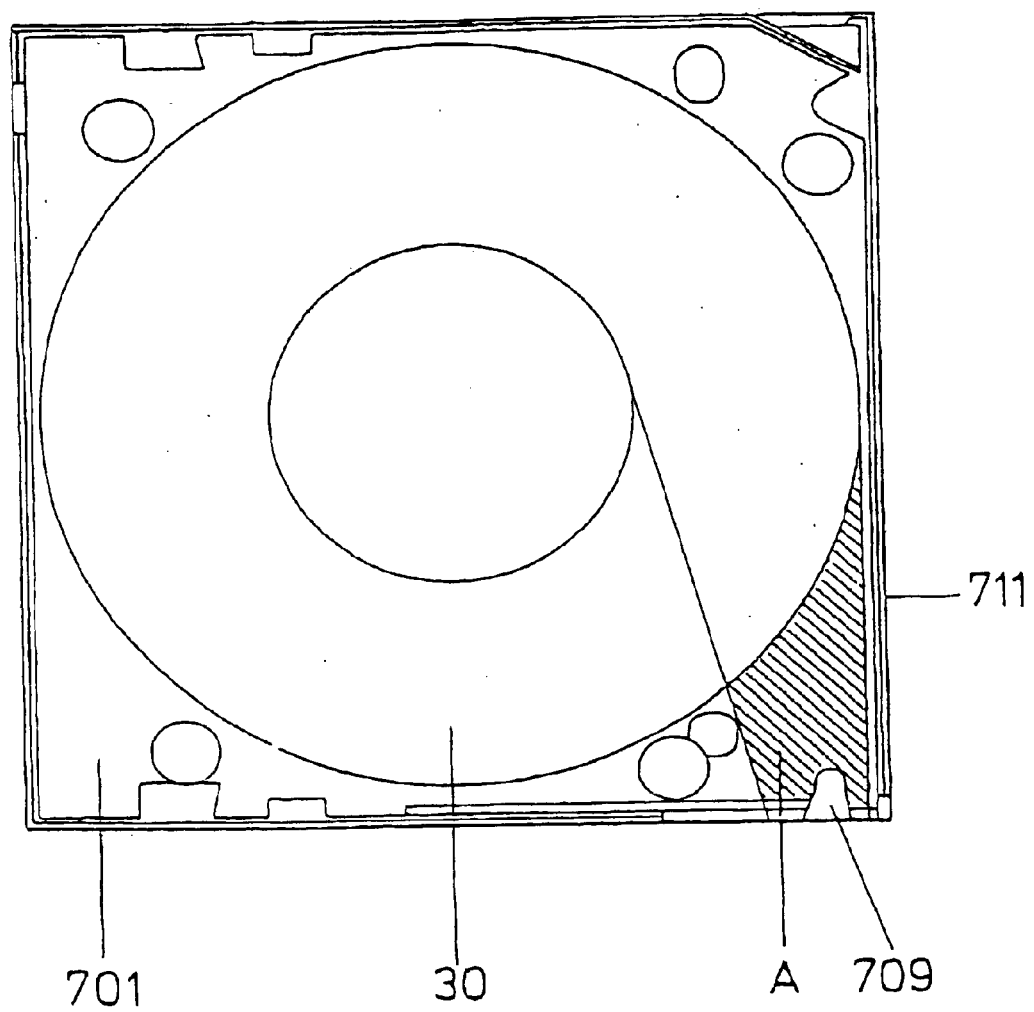
FIG. 1 shows a schematic plan view of a housing lower part of a cartridge according to the prior art.
Figure 2:
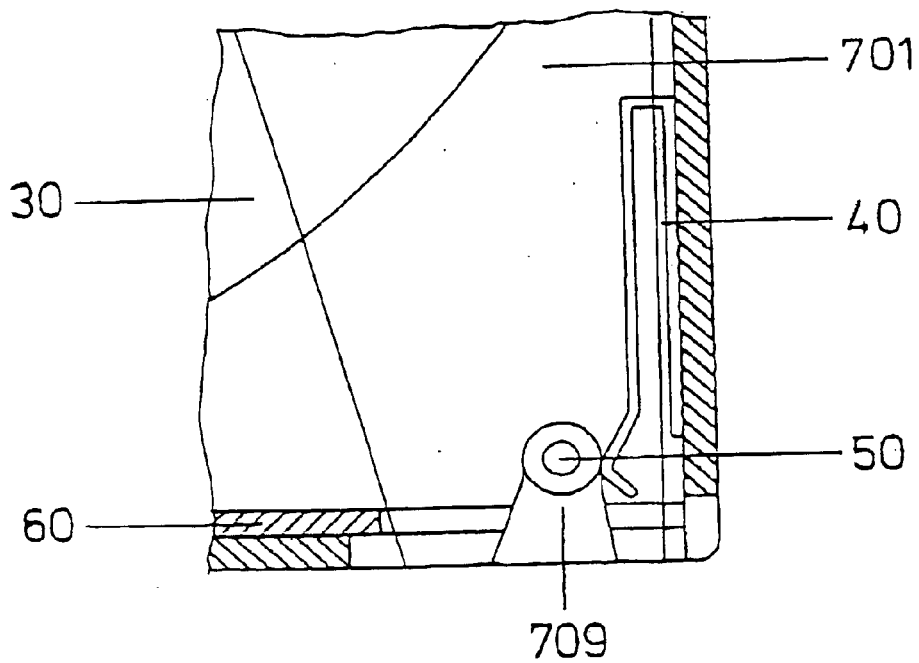
FIG. 2 shows a vertical section through the region of the tape exit opening of a cartridge according to the prior art.
Figure 3:
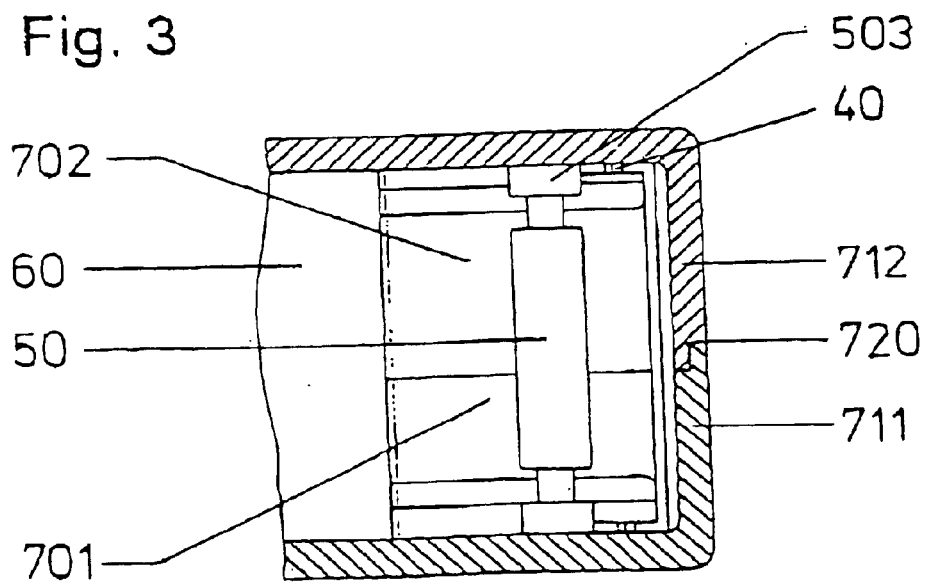
FIG. 3 shows a side view in the direction of the tape exit opening of the region represented in FIG. 2.
Figure 4:
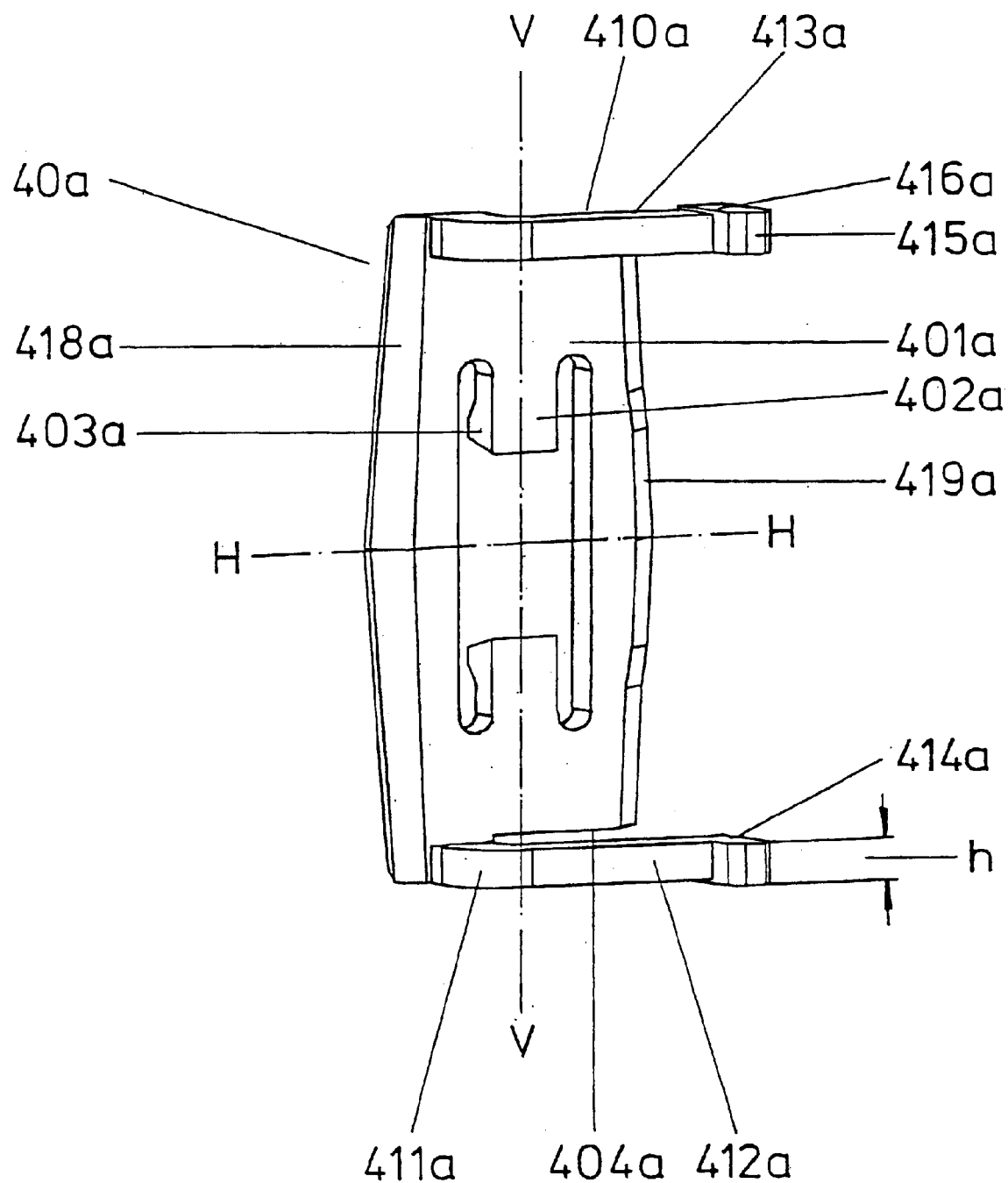
FIG. 4 shows a perspective representation of a first embodiment of a tape guiding pin clasp according to the invention.

As can be seen from FIG. 4, the tape guiding pin clasp 40a is symmetrically formed with respect to the horizontal center line H and essentially comprises the retaining plate 401a. The side of the retaining plate facing the reel 30 is preferably planar while the opposite side is beveled, starting from the horizontal center line H, i.e., in the direction of the two end faces in a way corresponding to the contour of the receiving pockets 721, 722 located in the cartridge side walls 711, 712. Two spring elements 410a are formed on the end faces 404a of the retaining plate 401a. These spring elements 410a essentially comprise an arcuate, offset fastening portion 411a and the spring arm 412a. The respective free end of each arm 412a is adjoined by the arresting portion 414a, each being formed with the contact surface 415a. The contact surface 415a is, with respect to the tape guiding pin 50 of an at least partially cylindrical form. The spring element 410a preferably has a rectangular cross section. Other cross-sectional shapes are likewise possible, it also being possible for the individual portions of the spring element 410a to have different cross sections in a way corresponding to the materials selected for the tape guiding pin clasp 40a. The outwardly facing planar surface 416a of the arresting portion 414a rises up in a step-shaped manner above the outwardly facing planar surface 413a of the spring arm 412a in order, on the one hand to, compensate for the production-related vertical tolerances, which have an effect during the assembly of the cartridge parts, and, on the other hand, to ensure that the retaining force for the tape guiding pin 50 is not adversely influenced by additional friction, based on undesirable contact of the spring arm 410a with the corresponding housing surface. The overall height h of the arresting portion 414a corresponds to the height of the clamping portion 503 (see FIG. 3) of the tape guiding pin 50.

The retaining plate 401a has, with respect to the horizontal center line H and with respect to the vertical center line V, a symmetrical essentially H-shaped recess. The free ends of the remaining central tabs 402a are formed as clips 403a which engage in corresponding recesses 713 and 714 of the cartridge side walls 711 and 712 when the tape guiding pin clasp 40a is inserted into the cartridge housing. The H-shaped recess and the thickness of the retaining plate 401a are formed in such a way that, on the one hand, the resultant dimensions of the clips 403a ensure a sufficiently stable clip connection 730 with the cartridge side walls 711 and 712 and, on the other hand, no deforming or deformation of the retaining plate 401a and of the cartridge side walls 711 and 712 occurs.

Figure 11:
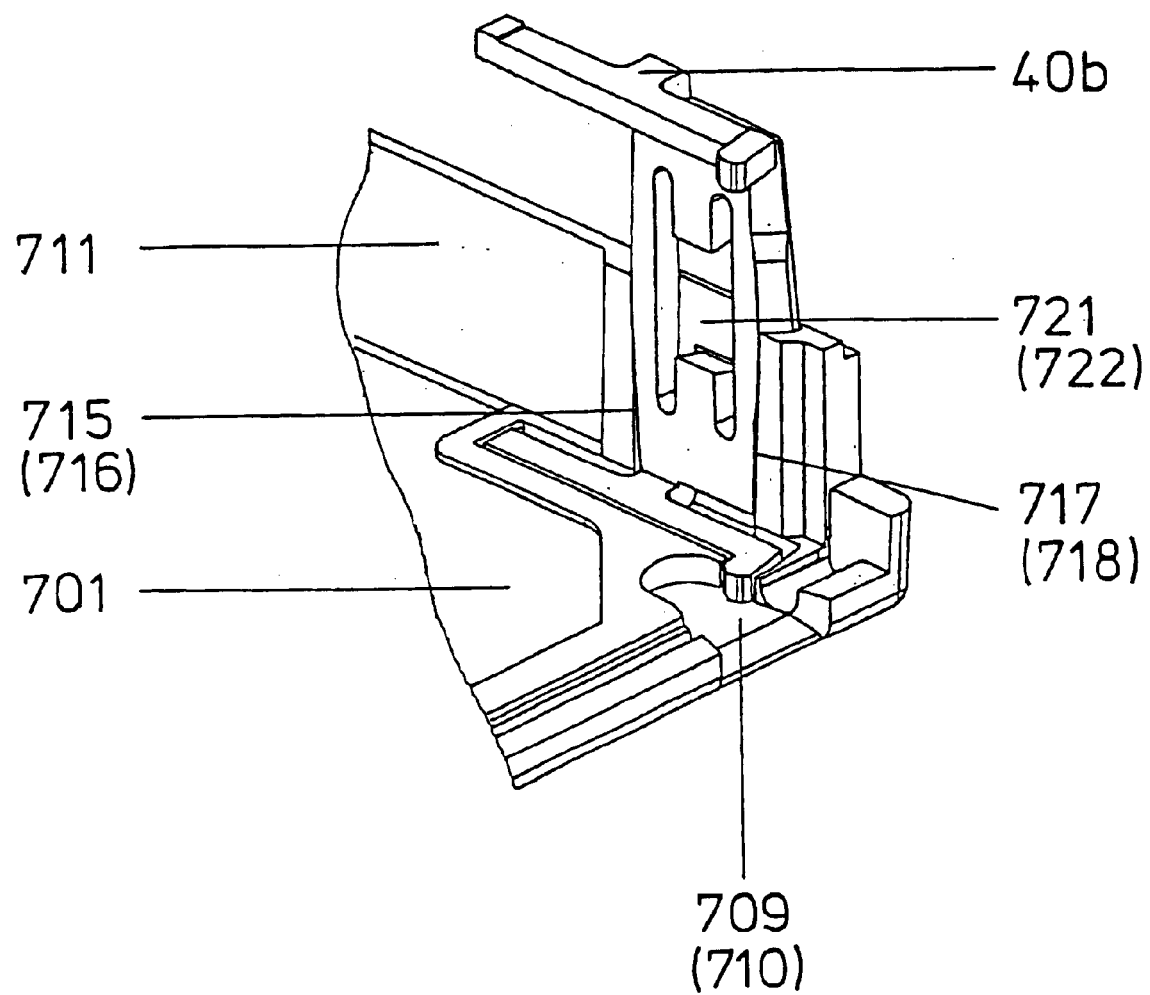
FIG. 11 shows a perspective representation of part of a cartridge according to the invention with a fitted tape guiding pin clasp according to embodiment 2.

The longitudinal sides of the retaining plate 401a have tapering mounting bevels 418a and 419a which run from the horizontal center line H in the direction of the end faces and are additionally formed as dovetails, so that, in interaction with the bevels 715 and 716 (see e.g., FIG. 11) provided in the cartridge side walls 711 and 712, a dovetail guide is produced, through which the forces arising when the tape guiding pin 50 is moved in and out are introduced into the cartridge side walls 711 and 712.

A particularly preferred embodiment of the dovetail guide is obtained if the guiding surfaces formed by the bevels 418a and facing in the direction of the fastening portion 411a preferably provide support over their full surface area and the guiding surfaces formed by the bevels 419a, and facing in the direction of the arresting portion 414a preferably provide only partial support. This is achieved, for example, by the mounting bevels 419a facing in the direction of the arresting portion 414a being partially set back, so that only supporting subsurfaces remain in a restricted region above and below the horizontal center line H. This compensates for production-related tolerances and the tape guiding pin clasp 40a can be mounted in the cartridge housing without any play or significant stress.

Figure 8:
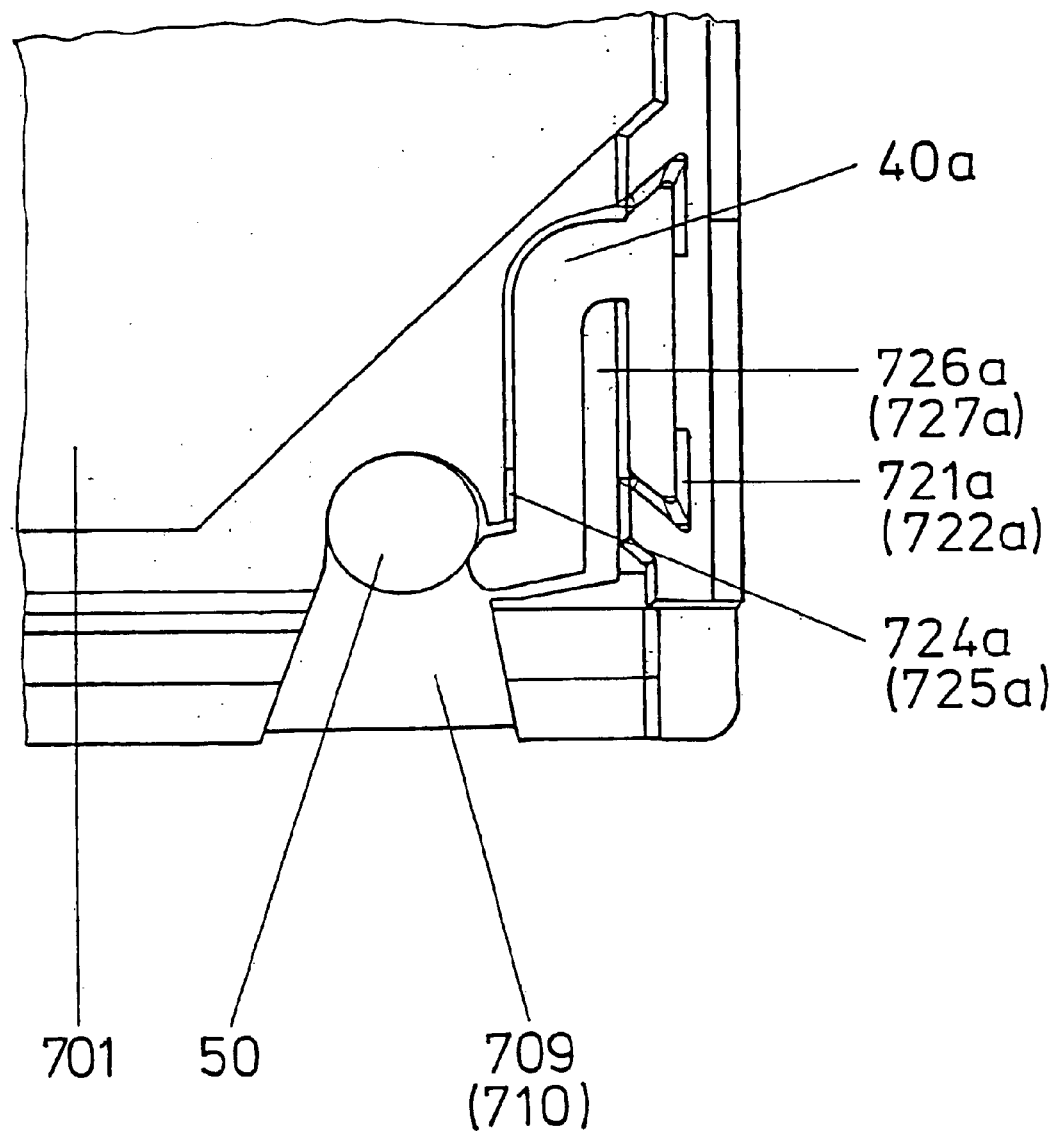
FIG. 8 shows a partial plan view of the region of the tape exit opening of the first embodiment of a cartridge according to the invention.

As can also be seen from FIG. 8, the respective recesses 726a, 727a provided in the lower cartridge part 701 and in the upper cartridge part 702, for receiving the spring arms 410a, are formed in such a way that the spring arm in the unloaded state, that is when the tape guiding pin 50 is in the position of rest in the cartridge housing or in the operating position outside the cartridge housing, bears against the projections 724a, 725a. The projection 724a is located in the lower housing part 701 and the projection 725a is located in the upper housing part 702. This arrangement, together with the dimensions of the arresting portion 414a, achieves the effect that, after the tape guiding pin clasp 40a has been fitted into the housing halves 701, 702, the spring arms 412a are under slight prestress. On the other hand, the tape guiding pin 50 does not induce any additional stress in the spring arms 412a when it is in the position of rest in the cartridge housing. This means that the retaining forces only act on the spring arms 412a during the operation of moving the tape guiding pin 50 in and out, and a more prolonged constancy of the retaining force is achieved as a result. A preferred second embodiment of the tape guiding pin clasp 40b will now described with reference to FIG. 5, FIG. 10 and FIG. 11.

Figure 5:
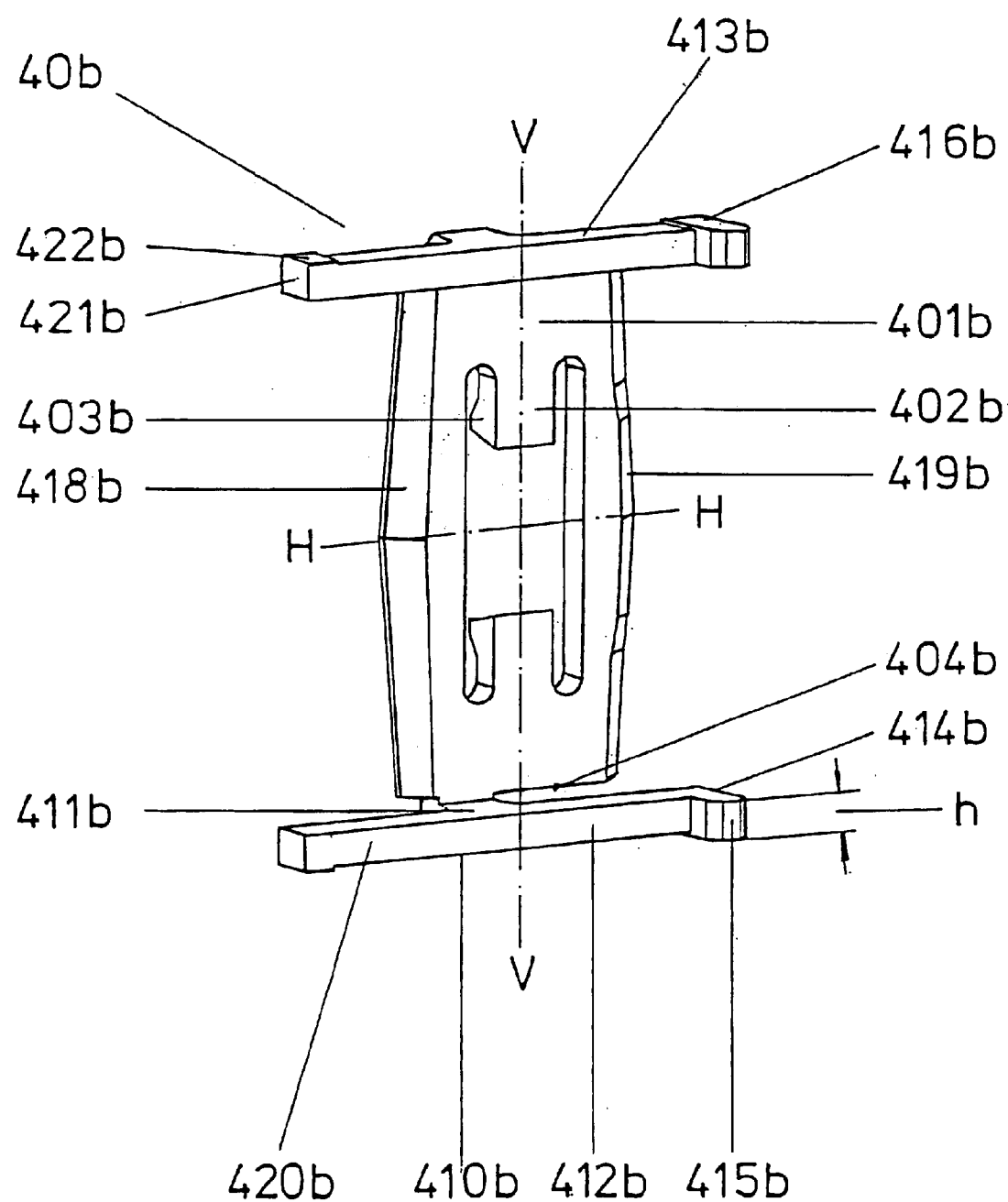
FIG. 5 shows a perspective representation of a second embodiment of a tape guiding pin clasp according to the invention.

As can be seen from FIG. 5, the second embodiment of the tape guiding pin clasp 40b is likewise formed symmetrically with respect to the horizontal center line H, with the retaining plate 401b corresponding in all design details to the retaining plate 401a of the first embodiment. This applies in particular to the preferred embodiment of the dovetail guide, here the guiding surfaces formed by the bevels 418b and facing in the direction of the supporting portion 420b providing support over their fill surface area and the guiding surfaces formed by the bevels 419b and facing in the direction of the arresting portion 414b providing only partial support. The reference numbers equivalent to the first embodiment and not explained any further here are identified by an appended "b", as used generally in the description of the second embodiment.

The spring element 410b itself is subdivided into the supporting arm 420b and the spring arm 412b, with the spring arm 412b again being adjoined by the arresting portion 414b. The contact surface 415b of the latter with respect to the tape guiding pin 50 is of a convex form, and the spring element 410b is articulated on the retaining plate 401b between the supporting arm 420b and the spring arm 412b by way of the fastening portion 411b. The spring element 412b preferably has a rectangular cross section. In the embodiment shown here, the fastening portion 411b is located approximately at the center of the spring element 410b, but both the position of the fastening portion 411b and the cross section of the spring arm 412b can be varied in consideration of the respective conditions.

As already described in the first embodiment, here, too, the outwardly facing planar surface 416b of the arresting portion 414b rises up in a step-shaped manner above the outwardly facing planar surfaces 413b of the spring arm 412b. A similar step-shaped elevation 422b is provided on the free end of the supporting arm 421b in a way corresponding to the requirements of the spring element 410b, in order, on the one hand, to restrict the production-related vertical tolerances, which have an effect during the assembly of the cartridge parts, and on the other hand, to ensure that the retaining force for the tape guiding pin 50 is not adversely influenced by additional friction, based on undesirable contact of the spring arm 410b with the corresponding surface of the housing recess 726b, 727b. Both the overall height h of the arresting portion 414b and the overall height of the supporting arm 421b, including the stepped elevation 422b provided at its free end, correspond to the height of the clamping portion 503 of the tape guiding pin 50.

Figure 10:
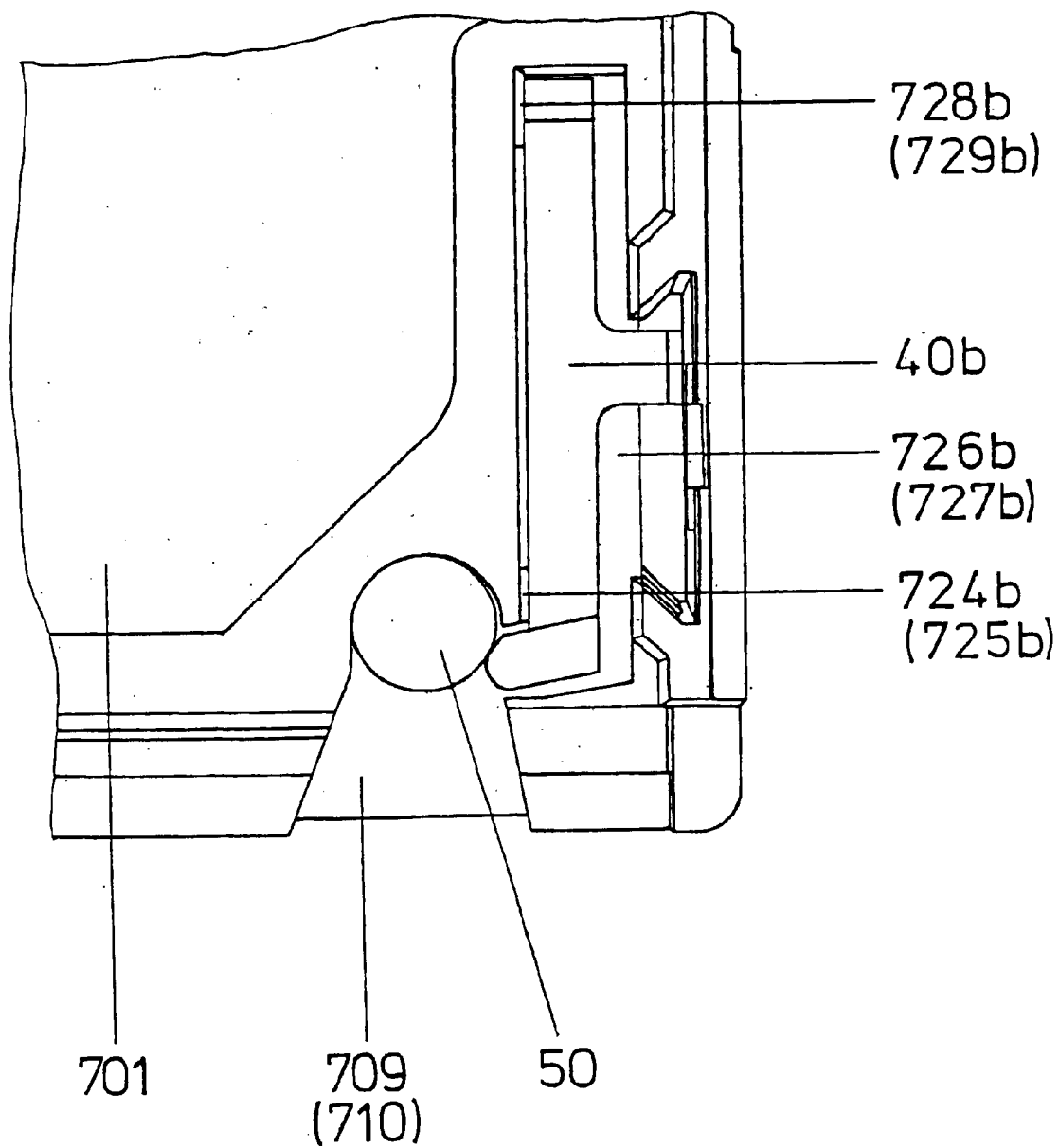
FIG. 10 shows a partial plan view of the region of the tape exit opening of the second embodiment of a cartridge according to the invention.

As can also be seen from FIG. 10, the clearance 726b, 727b provided in the lower cartridge part 701 and upper cartridge part 702, for receiving the spring arm 410b, is formed in such a way that the spring arm in the unloaded state, that is when the tape guiding pin 50 is in the position of rest in the cartridge housing or in the operating position outside the cartridge housing, bears against the projections 724b, 725b, 728b and 729b, with the projections 724b and 728b being located in the lower housing part 701 and the projections 725b and 729b being located in the upper housing part 702. This arrangement, together with the dimensions of the arresting portion 414b, achieves the effect that, after the tape guiding pin clasp 40b has been fitted into the housing halves 701, 702, the spring arms 412b are under slight prestress, but the tape guiding pin 50 does not induce any additional stress in the spring arms 412b of the tape guiding pin clasp 40b when it is in the position of rest in the cartridge housing. This again means that the retaining forces only act on the spring arms 412b during the operation of moving the tape guiding pin 50 in and out, and a more prolonged constancy of the retaining force is achieved as a result.

A further advantage of this described embodiment is consequently that the forces arising during the moving in and out of the tape guiding pin 50 are introduced into the bottom of the cartridge and the top of the cartridge via the resting surfaces of the projections 724b, 725b, 728b and 729b, and consequently do not act on the dovetail guide. Furthermore, no relative movement between the supporting arm 420b, the lower part of the cartridge 701 and the upper part of the cartridge 702 is produced in the region of the bearing surfaces of the projections 724b, 725b, 728b and 729b, and consequently no quality-reducing abrasion occurs at this location.

As already mentioned at the beginning, the tape guiding pin gripper/tape guide system, which guides the data medium in tape form to the take-up reel of the drive, imposes high requirements on the tape guiding pin clasp 40a, 40b, 40c and 40d. Of particular significance here are both the dimensional accuracy, while maintaining smallest possible production tolerances, and the material used. While the dimensional accuracy is ensured by using the precision injection-molding process, with respect to the selection of the material to be used it is necessary to ensure a high modulus of elasticity and adequate lubricity, to prevent inadmissible fluctuations in the retaining force due to diminishing of the resilient force and also due to changing frictional conditions in the region of the contact surfaces of the tape guiding pin and tape guiding pin clasp.

High-grade moldable plastics are suitable as the material for the tape guiding pin clasp 40a, 40b, 40c and 40d, high-grade being understood to mean plastics with a high modulus of elasticity and good wear resistance. Thermoplastics, elastomers and thermosetting plastics are suitable as base materials. Examples of preferred materials which can be used are polycarbonate (PC), polyamide (PA) and polyoxymethylene (POM), it also being possible for the base materials to be provided with fillers or functional additives. Both organic and inorganic substances are suitable as fillers, taking the form of particles, for example as fibers or spheres.

Carbon-fiber-reinforced polyoxymethylene is particularly preferred, the lubricity being ensured by the addition of polytetrafluoroethylene.

A material which meets these requirements is obtainable for example under the designation KCL-4022D from the company LNP Engineering Plastics Inc. This material is based on polyoxymethylene, contains 10% carbon fiber and 10% polytetrafluoroethylene and has a modulus of elasticity of 7 300 Mpa.

To obtain both a reliably acting clip connection 730 and a functionally capable dovetail guide, the wall thickness of the cartridge side walls 711, 712, lying in the running-out direction of the tape, of the lower housing part 701 and the housing upper part 702 is preferably to be increased in the corresponding region, in particular in the region of the bevels (715, 717 in the lower housing part and 716, 718 in the upper housing part—not shown) to the extent permitted by the run-out of the tape.

As FIG. 9 also reveals, for simple release of the clip connection 730, it is expedient to provide in the cartridge side walls 711 and 712, in the region of the clip connections 730, a respective bore 733, through which the clip 403a and 403b is pressed by way of a suitable pin (not shown) out of the corresponding recess 713, 714 of the cartridge side walls 711 and 712.

Figure 6:
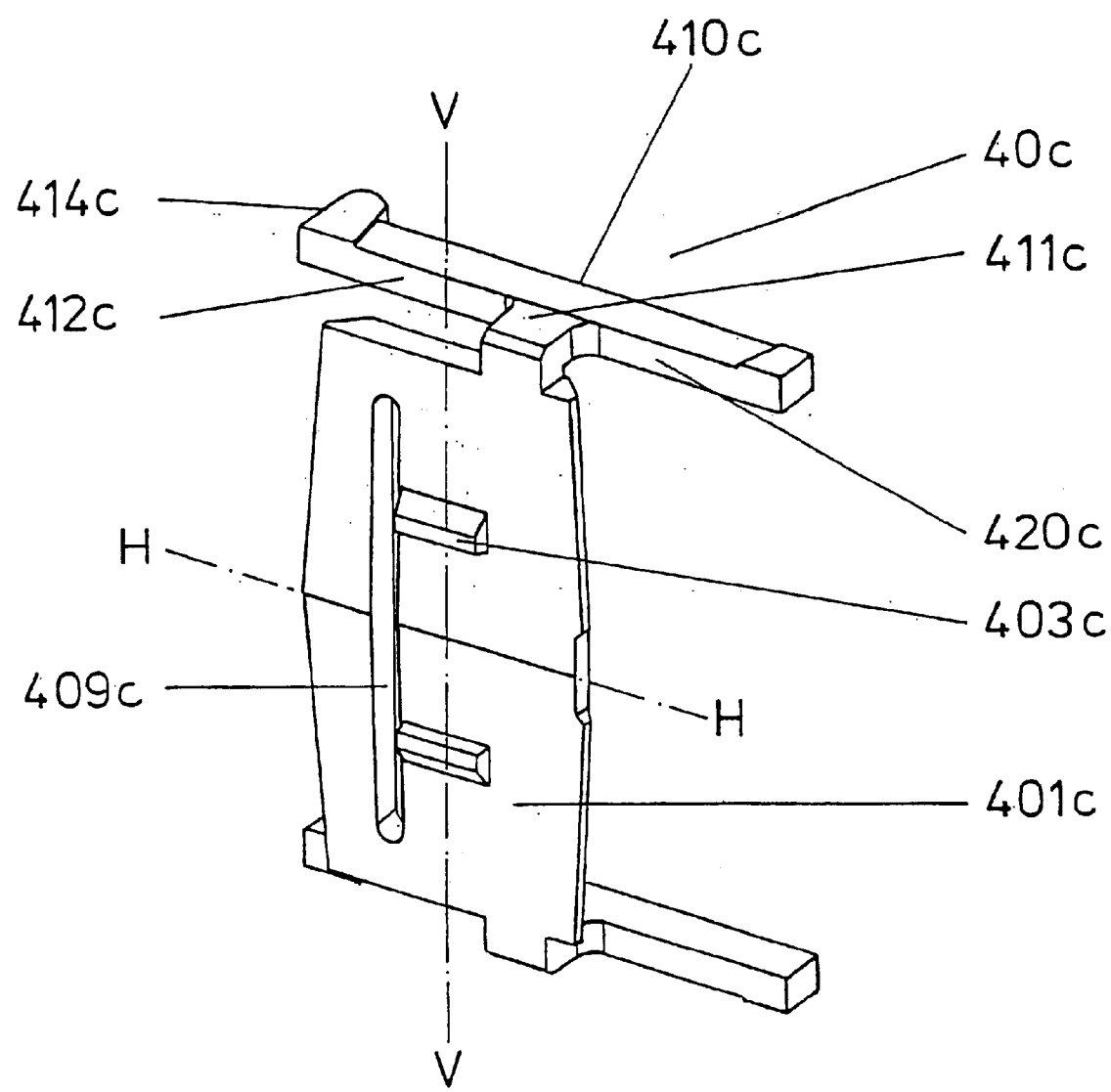
FIG. 6 shows a perspective representation of a third embodiment of a tape guiding pin clasp according to the invention.

The third tape guiding pin clasp 40c shown in FIG. 6, represents variation of the tape guiding pin clasp 40b depicted in FIG. 5 that has been optimized from technical injection-molding aspects. The retaining plate 401c is shown here as having only a slot-shaped recess 409c instead of the H-shaped recess. The reference numbers equivalent to the second embodiment and not explained any further here are identified by an appended "c".

Figure 7:
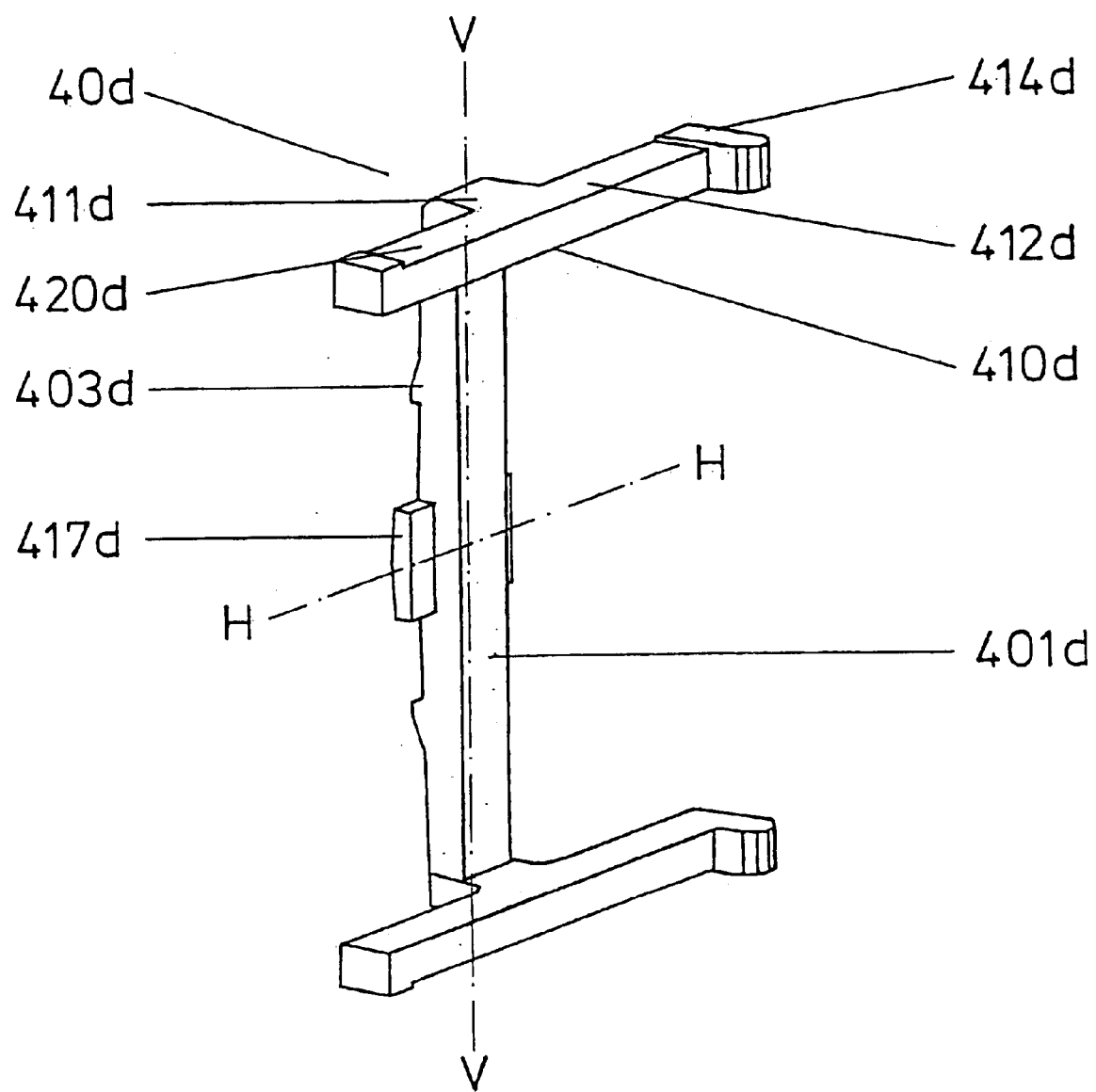
FIG. 7 shows a perspective representation of a fourth embodiment of a tape guiding pin clasp according to the invention.

Finally, represented in FIG. 7 is a further material-optimized variant of the tape guiding pin clasp 40d, with the retaining plate now only comprising a cross-piece 401d which connects the two spring arms 410d to each other. Provided on the cross-piece are both the two clips 403d for connecting the upper housing part 701 and the lower housing part 702 and the two butt straps 417d for fixing the tape guiding pin clasp 40d in the housing halves.

Use of the tape guiding pin clasps according to the invention that are represented is not restricted to, screwed cartridge housing they can also be used advantageously in the case of cartridge housing halves that are welded to each other.

What is claimed is:

1. A cartridge comprising:
   a housing which includes a lower cartridge part and an upper cartridge part;
   the lower cartridge part and the upper cartridge part being connected together;
   each of the lower cartridge part and the upper cartridge part comprising side walls and a recess which is adapted to receive a tape guiding pin;
   a reel that is rotatably mounted in the housing;
   a tape guiding pin clasp which fixes the tape guiding pin in the recesses of the lower cartridge part and the upper cartridge part;
   the tape guiding pin being located in a region of a tape exit opening that is located in a corner of the housing;
   the tape exit opening being adapted to be closed by a sliding door; and
   the tape guiding pin clasp comprising a mechanism that fixes at least one side wall of the lower cartridge part to at least one side wall of the upper cartridge part,
   wherein the tape guiding pin clasp engages with and fixes together the at least one side wall of the lower cartridge part and the at least one side wall of the upper cartridge part.

2. The cartridge of claim 1, wherein the cartridge is of the type for data recording media in tape form.

3. The cartridge of claim 1, wherein the cartridge is of the single-reel type.

4. The cartridge of claim 1, wherein the lower cartridge part and the upper cartridge part are connected together with screws.

5. The cartridge of claim 1, wherein the reel comprises wound magnetic tape.

6. The cartridge of claim 1, wherein the tape guiding pin clasp comprises two spring elements and a retaining plate portion.

7. The cartridge of claim 1, wherein the tape guiding pin clasp positively engages with and secures together the at least one side wall of the lower cartridge part and the at least one side wall of the upper cartridge part in both a horizontal direction and a vertical direction.

8. The cartridge of claim 1, wherein the tape guiding pin clasp engages with and secures together the at least one side wall of the lower cartridge part and the at least one side wall of the upper cartridge part via at least two clip connections.

9. The cartridge of claim 1, wherein the mechanism that secures the at least one side wall of the lower cartridge part to the at least one side wall of the upper cartridge part comprises two clips.

10. The cartridge of claim 9, wherein each of the two clips is coupled to a retaining plate of the tape guiding pin clasp.

11. The cartridge of claim 10, wherein each of the two clips engages in a corresponding recess in each of the at least one side walls.

12. The cartridge of claim 1, wherein the tape guiding pin clasp is arranged in a dovetail guide of the housing.

13. The cartridge of claim 12, wherein the tape guiding pin clasp comprises bevels which engage the dovetail guide.

14. The cartridge of claim 1, wherein the tape guiding pin clasp comprises bevels.

15. The cartridge of claim 1, wherein the tape guiding pin clasp comprises bevels and guiding surfaces formed by the bevels.

16. The cartridge of claim 1, wherein the tape guiding pin clasp comprises at least one arresting portion.

17. The cartridge of claim 16, wherein an overall height of the at least one arresting portion corresponds to a height of a clamping portion of the tape guiding pin.

18. The cartridge of claim 1, wherein the tape guiding pin clasp comprises two arresting portions.

19. The cartridge of claim 1, wherein the tape guiding pin clasp comprises at least one spring arm.

20. The cartridge of claim 1, wherein the tape guiding pin clasp comprises a plastic material.

21. The cartridge of claim 20, wherein the plastic material comprises a high-grade moldable plastic.

22. The cartridge of claim 21, wherein the high-grade moldable plastic comprises one of a polycarbonate, a polyamide and a polyoxymethylene, as a base material.

23. The cartridge of claim 22, wherein the high-grade moldable plastic comprises at least one of fillers and functional additives.

24. The cartridge of claim 1, wherein the tape guiding pin clasp comprises carbon-fiber-reinforced polyoxymethylene with polytetrafluoroethylene.

25. A cartridge comprising:

a housing which includes a lower cartridge part and an upper cartridge part;

each of the lower cartridge part and the upper cartridge part comprising side walls and a recess which is adapted to receive a pin;

a pin clasp having two spring arms adapted to retain the pin in the recesses of the lower cartridge part and the upper cartridge part;

the pin clasp comprising a first engaging clip portion that engages the at least one side wall of the lower cartridge part and a second engaging clip portion that engages the at least one side wall of the upper cartridge part, wherein the pin clasp secures together the at least one side wall of the lower cartridge part and the at least one side wall of the upper cartridge part.

26. A magnetic tape cartridge comprising:

a housing which includes a lower cartridge part and an upper cartridge part;

each of the lower cartridge part and the upper cartridge part comprising side walls and a recess which is adapted to receive a pin;

a plastic pin clasp having two spring arms adapted to retain the pin in the recesses of the lower cartridge part and the upper cartridge part;

the plastic pin clasp comprising a first engaging clip portion that engages the at least one side wall of the lower cartridge part and a second engaging clip portion that engages the at least one side wall of the upper cartridge part, wherein the plastic pin clasp secures together the at least one side wall of the lower cartridge part and the at least one side wall of the upper cartridge part.

* * * * *